(12) United States Patent
Chen

(10) Patent No.: US 8,868,980 B2
(45) Date of Patent: Oct. 21, 2014

(54) MONITORING CIRCUIT

(75) Inventor: Sherman Shan Chen, Zhejiang (CN)

(73) Assignee: EMC Corporation, Hopkinton, MA (US)

( * ) Notice: Subject to any disclaimer, the term of this patent is extended or adjusted under 35 U.S.C. 154(b) by 316 days.

(21) Appl. No.: 13/105,500

(22) Filed: May 11, 2011

(65) Prior Publication Data
US 2012/0084596 A1 Apr. 5, 2012

(30) Foreign Application Priority Data
Sep. 30, 2010 (CN) .......................... 2010 1 0297739

(51) Int. Cl.
G06F 11/00 (2006.01)
G06F 11/07 (2006.01)
G06F 11/20 (2006.01)

(52) U.S. Cl.
CPC ........ *G06F 11/0745* (2013.01); *G06F 11/2007* (2013.01); *G06F 11/0793* (2013.01)

USPC .......................................................... 714/43

(58) Field of Classification Search
USPC ..................... 714/1, 2, 39, 43, 47.1
See application file for complete search history.

(56) References Cited

U.S. PATENT DOCUMENTS

| | | | | |
|---|---|---|---|---|
| 3,192,449 A * | 6/1965 | Brockett | ....................... | 361/196 |
| 6,874,052 B1 * | 3/2005 | Delmonico | ................... | 710/305 |
| 7,085,863 B2 * | 8/2006 | Barenys et al. | ................ | 710/104 |
| 7,478,286 B2 * | 1/2009 | Humphrey et al. | ............. | 714/43 |
| 7,721,155 B2 * | 5/2010 | Holdaway et al. | .............. | 714/43 |
| 2002/0194548 A1 * | 12/2002 | Tetreault | ........................ | 714/43 |

* cited by examiner

*Primary Examiner* — Yolanda L Wilson
(74) *Attorney, Agent, or Firm* — Krishnendu Gupta; Konrad R. Lee

(57) ABSTRACT

A monitoring circuit monitors for the occurrence of a failure event on a data bus. The monitoring circuit includes a failure detection circuit for detecting the occurrence of the failure event within a device coupled to the data bus. An isolation circuit isolates the device from the data bus in response to the occurrence of the failure event.

21 Claims, 4 Drawing Sheets

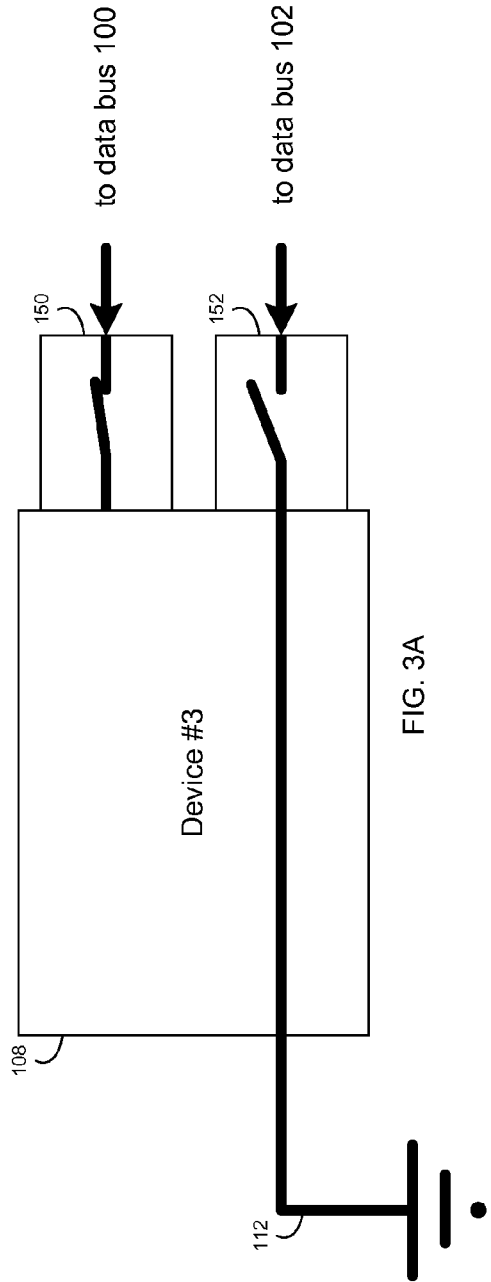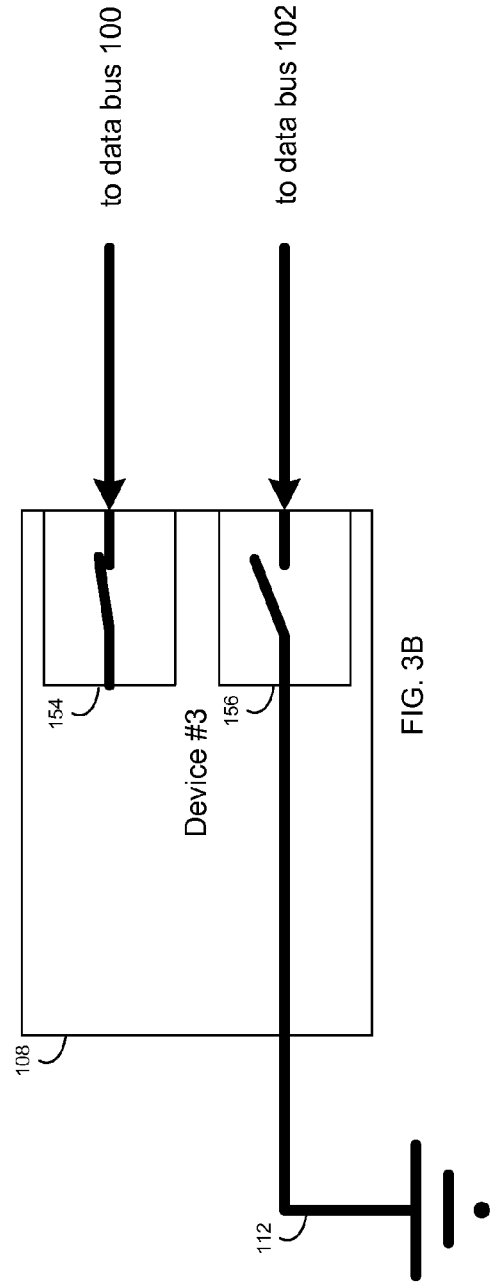

MONITORING CIRCUIT

TECHNICAL FIELD

This disclosure relates to I²C devices, more particularly, to I²C devices that automatically isolate themselves from the I²C bus in the event of a failure.

BACKGROUND

With the current I²C bus redundancy strategy, it is common to route two I²C buses to each field replaceable unit (FRU) included within a system. With this redundant topology, in the event that one I²C bus fails due to a short circuit occurring in one of the FRUs attached to one of the I²C buses (thus shorting the impacted I²C bus), access to the remaining FRUs (including the defective FRU itself provided the redundant I²C interface is operational) is maintained due to access being available via the redundant I²C bus.

However, one shortcoming of this design is the inability to determine which FRU has failed, as the only information that the field engineer knows is that one FRU on the I²C bus is shorting the I²C bus. Accordingly, the field engineer would need to remove each FRU on the impacted I²C bus, one at a time, and check the status of the impacted I²C bus during each removal to see if the impacted I²C bus was restored. As several I²C devices may be coupled to the impacted I²C bus, this could prove to be a time consuming and fallible procedure for the field engineer.

SUMMARY OF DISCLOSURE

In a first implementation, a monitoring circuit monitors for the occurrence of a failure event on a data bus. The monitoring circuit includes a failure detection circuit for detecting the occurrence of the failure event within a device coupled to the data bus. An isolation circuit isolates the device from the data bus in response to the occurrence of the failure event.

One or more of the following features may be included. The failure detection circuit may include a delay circuit for delaying the isolation of the device from the data bus in response to the occurrence of the failure event. The delay circuit may include an RC circuit. The monitoring circuit may be included within the device. The monitoring circuit may include one or more switches for isolating the device from the data bus. The one or more switches may include one or more transistors. The data bus may be an I²C bus. The device may be an I²C device.

In another implementation, an I2C device is configured to be couplable to an I²C bus. The I²C device includes a failure detection circuit for detecting the occurrence of the failure event within the I²C device. An isolation circuit isolates the I²C device from the I²C bus in response to the occurrence of the failure event.

One or more of the following features may be included. A delay circuit may delay the isolation of the I²C device from the I²C bus in response to the occurrence of the failure event. The delay circuit may includes an RC circuit. The monitoring circuit may include one or more switches for isolating the I²C device from the I²C bus. The one or more switches may include one or more transistors.

In another implementation, a monitoring circuit monitors for the occurrence of a failure event on a data bus. The monitoring circuit includes a failure detection circuit for detecting the occurrence of the failure event within a device coupled to the data bus. An isolation circuit isolates the device from the data bus in response to the occurrence of the failure event. The failure detection circuit includes a delay circuit for delaying the isolation of the device from the data bus in response to the occurrence of the failure event.

One or more of the following features may be included. The delay circuit may include an RC circuit. The RC circuit may be configured to control the operation of a first switch within the failure detection circuit. The first switch may be configured to control at least a second switch within the isolation circuit. The at least a second switch may be configured to isolate the device from the data bus in response to the occurrence of the failure event. The monitoring circuit may be included within the device. At least one of the first switch and the at least a second switch may include one or more transistors. The data bus may be an I²C bus. The device may be an I²C device.

The details of one or more implementations are set forth in the accompanying drawings and the description below. Other features and advantages will become apparent from the description, the drawings, and the claims.

BRIEF DESCRIPTION OF THE DRAWINGS

FIG. 3A is a diagrammatic view of a first implementation of a monitoring circuit;
FIG. 3B is a diagrammatic view of an alternative implementation of the monitoring circuit of FIG. 3A.

Like reference symbols in the various drawings indicate like elements.

DETAILED DESCRIPTION OF THE PREFERRED EMBODIMENTS

Figure 1:
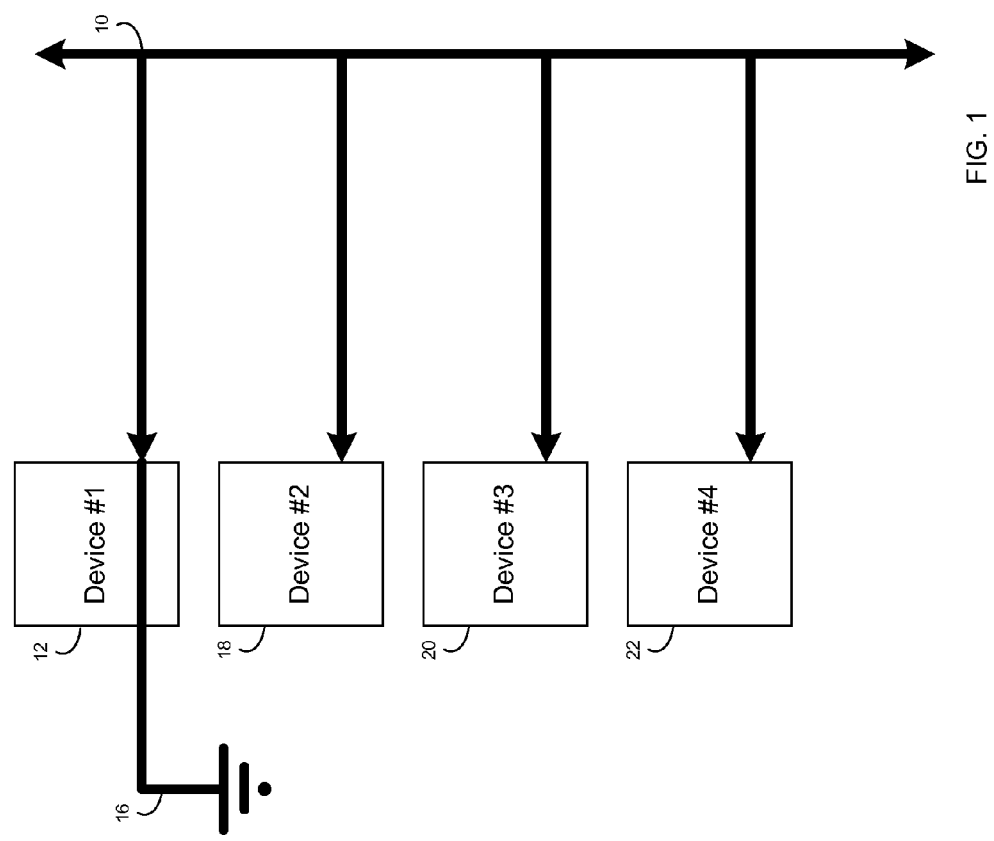
FIG. 1 is a diagrammatic view of a single bus data system.

Referring to FIG. 1, there is shown a system in which data bus 10 is used to connect multiple devices (e.g., device 12) within a computing system (e.g., computing system 14).

An example of data bus 10 is an I²C bus and an example of device 12 is an I²C device (e.g., DACs, ADCs, host adaptors, USB adapters, hardware monitor interfaces, diagnostic sensor interfaces, configuration data interfaces, and clock interfaces). As is known in the art, an I²C bus is a serial, multi-master, single-ended computer bus that allows communication between low-speed peripheral devices and a motherboard or embedded system. Typically, the I²C uses two bidirectional, open drain lines, namely a Serial Data Line (SDA, not shown) and a Serial Clock Line (SCL, not shown) that typically operate in the 3.3-5.0 VDC range.

Accordingly, in the event that either of SDL or SDA included within an I²C data bus is tied/shorted to ground (as represent by short 16), communication with the devices coupled to the I²C bus is interrupted until the fault is corrected. Therefore, in the event that short 16 within device 12 results in either or both of the SDA and/or SCL within data bus 10 being tied/shorted to ground, communication with any of the devices (e.g., devices 12, 18, 20, 22) coupled to data bus 10 would also be interrupted (as data bus 10 would cease to operate).

While the previous discussion concerns an I²C data bus, it is understood that the I²C data bus is being used solely for illustrative purposes and the above-discussion is equally applicable to other forms of buses (such as USB).

Figure 2:
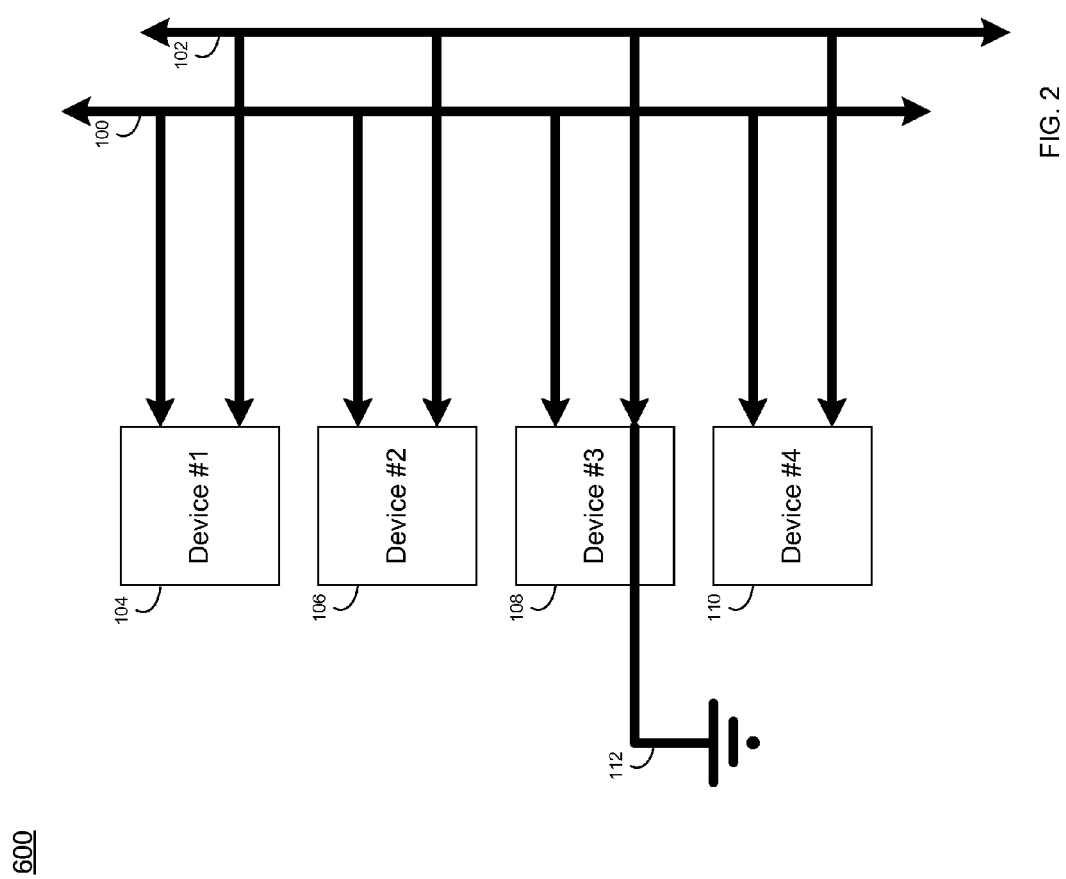
FIG. 2 is a diagrammatic view of a multi-bus data system.

Referring also to FIG. 2, there is shown a bus configuration that allows for continued communication with the devices coupled to a data bus after the occurrence of a device failure that results in the data bus being tied/shorted to ground. Specifically, a second, redundant data bus may be included that may continue to operate after the failure of the device that rendered the first data bus inoperable. For example, a pair of data buses (e.g., data busses 100, 102) may be coupled to each device (e.g., devices 104, 106, 108, 110) included within the computing system.

Therefore, in the event that short 112 within device 108 results in either or both of the SDA and/or SCL within e.g., data bus 102 being tied/shorted to ground, communication with any of the other devices (e.g., devices 104, 106, 110) within the system would be maintained. Specifically, while the occurrence of short 112 may disrupt communications on data bus 102, redundant data bus 100 would continue to operate. Accordingly, devices 104, 106, 110 would be capable of continued communication via data bus 100. However, as long as short 112 exists, data bus 102 would be down.

Referring also to FIGS. 3A-3B, there is shown various implementations of a monitoring circuit (e.g., monitoring circuit 150, 152, 154, 156) that may allow for detection of a failure event (e.g., short 112) within a device (e.g., device 108) coupled to a data bus, such as data bus 100 and/or data bus 102. In response to the detection of such a failure event, the monitoring circuit (e.g., monitoring circuit 150, 152, 154, 156) may isolate the device (e.g., device 108) from the data bus (e.g., data bus 100 and/or data bus 102) in response to the occurrence of the failure event (e.g., short 112).

The manner in which the monitoring circuit (e.g., monitoring circuit 150, 152, 154, 156) is configured may vary depending upon the specific application. For example, the monitoring circuit (e.g., monitoring circuit 150, 152, 154, 156) may be configured to be external to the device (e.g., as illustrated with monitoring circuits 150, 152). Accordingly and in this configuration, the data bus (e.g., data bus 100 and/or data bus 102) may be coupled to the monitoring circuit (e.g., monitoring circuit 150 and/or monitoring circuit 152, respectively), and the monitoring circuit (e.g., monitoring circuit 150 and/or monitoring circuit 152) may be coupled to the device (e.g., device 108).

Alternatively, the monitoring circuit (e.g., monitoring circuit 150, 152, 154, 156) may be configured to be included within the device (e.g., as illustrated with monitoring circuits 154, 156). Accordingly and in this configuration, the data bus (e.g., data bus 100 and/or data bus 102) may be coupled to the device (e.g., device 108) and may pass through the appropriate internal monitoring circuits (e.g., monitoring circuit 154 for data bus 100 and monitoring circuit 152 for data bus 102).

In the event of a failure event (e.g., short 112) within device 108 coupled to e.g., data bus 100 and/or data bus 102, one or more of monitoring circuit 150, 152, 154, 156 may be isolate the failed device (e.g., device 108) from the appropriate data bus (e.g., data bus 100 and/or data bus 102). For illustrative purposes, monitoring circuits 150, 154 are shown to be in a conducting state, while monitoring circuits 152, 156 are shown to be in an isolating state (e.g., due to the occurrence of short 112).

Figure 4:
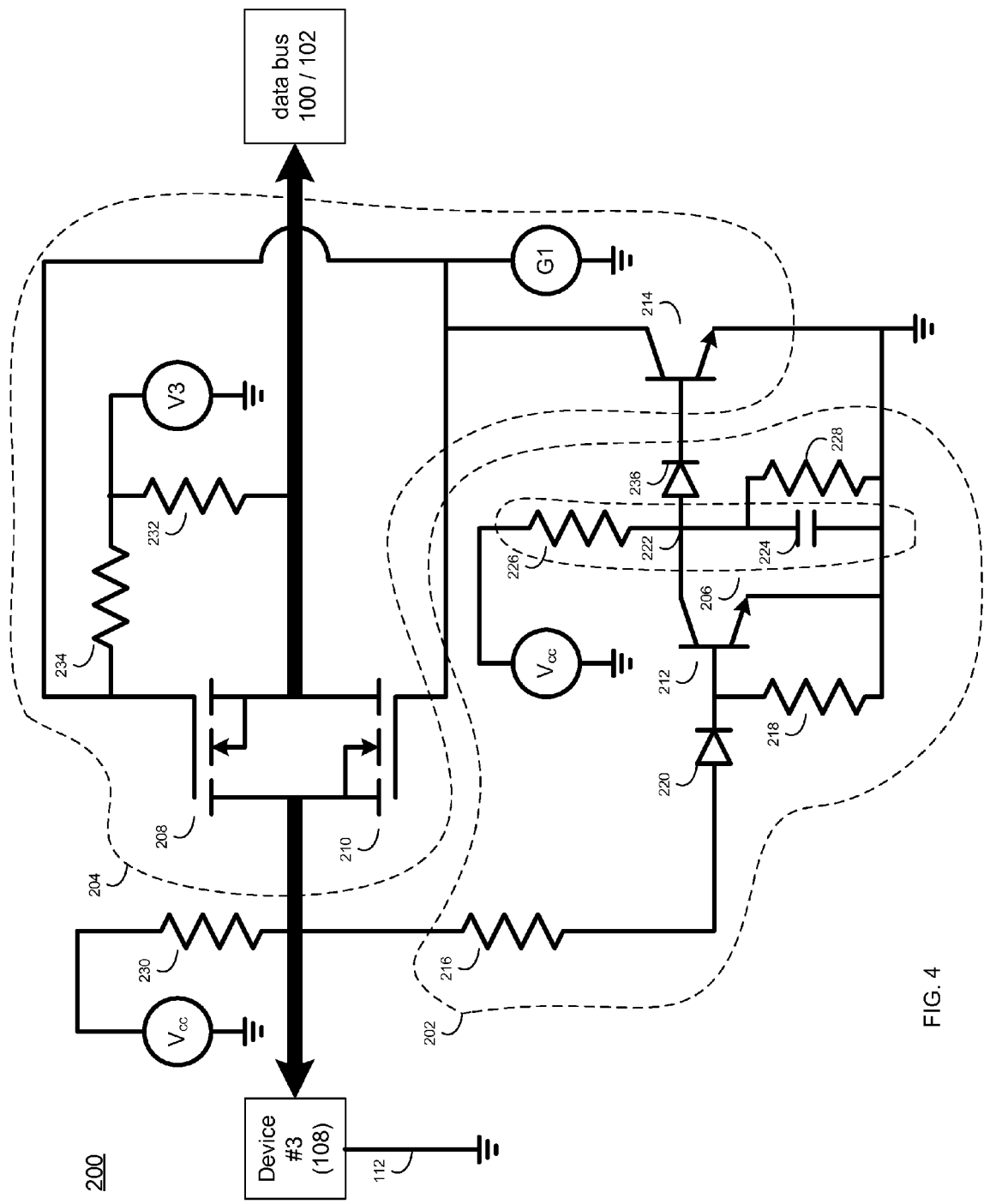
FIG. 4 is an illustrative schematic diagram of the monitoring circuit of FIG. 3A or FIG. 3B.

Referring also to FIG. 4, there is shown an exemplary schematic view of one implementation 200 of the above-described monitoring circuit (e.g., monitoring circuit 150, 152, 154, 156).

Monitoring circuit 200 may include failure detection circuit 202 that may be configured to detect the occurrence of the failure event (e.g., short 112) within a device (e.g., device 108) coupled to the data bus (e.g., data bus 100 and/or data bus 102). In response to the detection of such a failure event (e.g., short 112), isolation circuit 204 may isolate the device (e.g., device 108) from the data bus (e.g., data bus 100 and/or data bus 102) so that the utility of the data bus may be restored.

Failure detection circuit 202 may include delay circuit 206 that may be configured to delay the isolation of the device (e.g., device 108) from the data bus (e.g., data bus 100 and/or data bus 102) in response to the occurrence of the failure event (e.g., short 112). One exemplary embodiment of delay circuit 206 is an RC circuit. Monitoring circuit 200 (e.g., within failure detection circuit 202 and/or isolation circuit 204) may include one or more switches (e.g., transistors 208, 210, 212, 214) for isolating the device (e.g., device 108) from the data bus (e.g., data bus 100 and/or data bus 102) in response to the occurrence of the failure event (e.g., short 112).

Assume for illustrative purposes that short 112 occurs (e.g., a failure occurs within device 108), which draws the data bus (e.g., data bus 100 and/or data bus 102) down to ground, thus rendering the data bus (e.g., data bus 100 and/or data bus 102) inoperable. Accordingly, as the data bus is now at zero potential, the voltage drop across resistor 216, resistor 218, and diode 220 are all reduced to zero. Accordingly, the voltage at the base of transistor 212 will also be zero, thus shutting off transistor 212. An example of transistor 212 is an NPN bipolar transistor, such as an MMBT222A transistor manufactured by Fairchild Semiconductor. An example of diode 220 is a BAT54LP diode manufactured by Diodes Incorporated. Exemplary values of resistors 216, 218 are 100 K and 120 K respectively.

Prior to being shut off, transistor 212 tied junction 222 to ground, thus ensuring that transistor 214 was off. However, once transistor 212 shuts off, junction 222 is no longer tied to ground and capacitor 224 will begin to charge via resistor 226. The rate at which capacitor 224 charges is controlled by the RC time constant of capacitor 224 and resistor 226. Exemplary values of capacitor 224 and resistor 226 are 1.0 microfarad and 200 Kohm respectively. An exemplary value of resistor 228 is 1.0 Mohm.

Assuming the above-described values, delay circuit 206 would have a delay factor of approximately 40 milliseconds. Accordingly, if a failure event is sensed, the isolation of the device from the data bus would be delayed by approximately 40 milliseconds to avoid false trigger events that may be caused by the normal 10 millisecond low level times that occur when the I²C bus is operating at 100 kilohertz.

Once capacitor 224 is sufficiently charged, transistor 214 will turn on, thus tying voltage source G1 to ground. An example of transistor 214 is an NPN bipolar transistor, such as an MMBT222A transistor manufactured by Fairchild Semiconductor.

Once voltage source G1 is tied to ground, transistors 208, 210 will shut off, thus opening the connection between data bus 100 and/or data bus 102 and (in this example) device 108, thus isolating device 108 from data bus 100 and/or data bus 102. An example of transistors 208, 210 is an N Channel MOSFET, such as a 2N7002E transistor manufactured by Diodes Incorporated. Accordingly, even though device 108 has failed, since monitoring circuit 200 sensed the failure and isolated device 108 from data bus 100 and/or data bus 102, data bus 100 and/or data 102 may continue to function after the failure of device 108.

Further, if a two bus system is utilized (as shown in FIGS. 2, 3A, & 3B, while the failed device will be isolated from the impacted bus, the device will still be able to communicate via the non-impacted bus (assuming that the failure within the device was not substantial enough to impact both buses). Accordingly, with the exception of the failed device, all devices on the system would be visible on both buses. However, the failed device would only be visible on the non-impacted bus. Accordingly, by determining which device is only visible on one bus, the identity of the failed device may be quickly determined.

Resistors 230, 232 may function as pull-up resistors that may provide the necessary voltage drop between their respective voltage source and data bus 100, 102. Further, resistors 232, 234 may form a voltage divider circuit to properly bias the gate of transistor 208. Exemplary values of resistors 230, 232, 234 are 10 Kohm, 10 Kohm, and 10 Kohm respectively. An example of diode 236 is a BAT54LP diode manufactured by Diodes Incorporated. An exemplary value of voltage source $V_{cc}$ may be in the range of 3.3-5.0 VDC. An exemplary value of voltage source G1 may be in the range of 3.3-5.0 VDC. An exemplary value of voltage source V3 may be in the range of 3.3-5.0 VDC.

The above-described monitoring circuits (e.g., monitoring circuit 150, 152, 154, 156) are described as being utilized within a dual (i.e., redundant) bus system, this is for illustrative purposes only and is not intended to be a limitation of this disclosure, as other configuration are possible and are considered to be within the scope of this disclosure. For example, such monitoring circuits (e.g., monitoring circuit 150, 152, 154, 156) may be utilized within a single (e.g., non-redundant) bus system.

A number of implementations have been described. Nevertheless, it will be understood that various modifications may be made. Accordingly, other implementations are within the scope of the following claims.

What is claimed is:

1. A monitoring circuit for monitoring for the occurrence of a failure event on a data bus, wherein the data bus is coupled to a first device and a second device, the monitoring circuit comprising:
a failure detection circuit for detecting the occurrence of the failure event within the first device coupled to the data bus; and
an isolation circuit for isolating the first device from the data bus in response to the occurrence of the failure event;
wherein the second device is enabled to operate utilizing the data bus while the first device is isolated from the data bus;
wherein the first device and the data bus includes a datapath therebetween, wherein the datapath passes through the monitoring circuit.

2. The monitoring circuit of claim 1 wherein the failure detection circuit includes a delay circuit for delaying the isolation of the first device from the data bus in response to the occurrence of the failure event.

3. The monitoring circuit of claim 2 wherein the delay circuit includes an RC circuit.

4. The monitoring circuit of claim 1 wherein the monitoring circuit is included within the first device.

5. The monitoring circuit of claim 1 wherein the monitoring circuit includes one or more switches for isolating the first device from the data bus.

6. The monitoring circuit of claim 5 wherein the one or more switches includes one or more transistors.

7. The monitoring circuit of claim 1 wherein the data bus is an I$^2$C bus.

8. The monitoring circuit of claim 1 wherein the first device is an I$^2$C device.

9. An I$^2$C device configured to be couplable to an I$^2$C bus, wherein the I$^2$C bus is coupled to a second I$^2$C device, the I$^2$C device comprising:
a failure detection circuit for detecting the occurrence of the failure event within the I$^2$C device; and
an isolation circuit for isolating the I$^2$C device from the I$^2$C bus in response to the occurrence of the failure event;
wherein the second I$^2$C device is enabled to operate utilizing the I$^2$C bus while the I$^2$C device is isolated from the I$^2$C bus;
wherein the I$^2$C device and the data bus includes a datapath therebetween, wherein the datapath passes through the monitoring circuit.

10. The I$^2$C device of claim 9 wherein the failure detection circuit includes a delay circuit for delaying the isolation of the I$^2$C device from the I$^2$C bus in response to the occurrence of the failure event.

11. The I$^2$C device of claim 10 wherein the delay circuit includes an RC circuit.

12. The I$^2$C device of claim 9 wherein the monitoring circuit includes one or more switches for isolating the I$^2$C device from the I$^2$C bus.

13. The I$^2$C device of claim 12 wherein the one or more switches includes one or more transistors.

14. A monitoring circuit for monitoring for the occurrence of a failure event on a data bus, wherein the data bus is coupled to a first device and a second device, the monitoring circuit comprising:
a failure detection circuit for detecting the occurrence of the failure event within the first device coupled to the data bus; and
an isolation circuit for isolating the first device from the data bus in response to the occurrence of the failure event;
wherein the failure detection circuit includes a delay circuit for delaying the isolation of the device from the data bus in response to the occurrence of the failure event;
wherein the second device is enabled to operate utilizing the data bus while the first device is isolated from the data bus;
wherein the first device and the data bus includes a datapath therebetween, wherein the datapath passes through the monitoring circuit.

15. The monitoring circuit of claim 14 wherein the delay circuit includes an RC circuit.

16. The monitoring circuit of claim 15 wherein the RC circuit is configured to control the operation of a first switch within the failure detection circuit.

17. The monitoring circuit of claim 16 wherein the first switch is configured to control at least a second switch within the isolation circuit, wherein the at least a second switch is configured to isolate the first device from the data bus in response to the occurrence of the failure event.

18. The monitoring circuit of claim 17 wherein the monitoring circuit is included within the first device.

19. The monitoring circuit of claim 18 wherein at least one of the first switch and the at least a second switch includes one or more transistors.

20. The monitoring circuit of claim 14 wherein the data bus is an I$^2$C bus.

21. The monitoring circuit of claim 14 wherein the first device is an I$^2$C device.

* * * * *